Jan. 14, 1930.  P. E. MATTHEWS  1,743,226
COMBINED TRANSMISSION UNIT
Filed June 23, 1928  2 Sheets-Sheet 2

Inventor:
Philip E. Matthews
By his Attorneys,
Redding, Greeley, O'Shea & Campbell Patented Jan. 14, 1930

1,743,226

UNITED STATES PATENT OFFICE

PHILIP E. MATTHEWS, OF PLAINFIELD, NEW JERSEY, ASSIGNOR TO INTERNATIONAL MOTOR COMPANY, OF NEW YORK, N. Y., A CORPORATION OF DELAWARE

COMBINED TRANSMISSION UNIT

Application filed June 23, 1928. Serial No. 287,738.

The present invention relates to improved transmission constructions having a plurality of controls incidental to the operation thereof. In the particular construction in which the invention has been shown, a vehicle transmission has been provided with a secondary set of change speed gearing which is operated in conjunction with the primary or usual transmission gearing to effect multiple ranges of speeds.

With the added control lever for the secondary set, as well as the usual gear shifting lever, emergency brake, and clutch pedal, considerable difficulty is experienced in providing a satisfactory and convenient mounting for such elements without increasing, materially, the number of parts or causing the cost of manufacturing and assembling the elements to be prohibitive.

An object of this invention is to provide a clutch housing construction which is formed to include the secondary change speed gears and to mount the controls mentioned above. By providing the bell housing of the clutch with suitable brackets and related structure, the housing and controls may be constructed as a unit and assembled in a single operation, corresponding to the assembling of the clutch housing in the usual manner.

The facility with which the entire device may be mounted will be quite apparent from the following description and further objects will appear as the invention is described in connection with the accompanying drawings, wherein.

Referring to the above drawings, $a$ designates the fly-wheel of an internal combustion engine provided with a clutch $b$ of any desired type. Between the clutch and the usual transmission, a secondary set of gears is provided for increasing the available number of speeds transmitted to the propeller shaft and for reversing the direction of rotation thereof. This secondary transmission embodies a gear and clutch element $c$ mounted on the extension of the drive shaft $b'$ and receiving the extremity of drive shaft $c'$ upon which is mounted slidable gear $c^2$. The shaft $c'$ is connected through a suitable universal joint to any desired type of transmission and power is supplied to such transmission through the secondary transmission embodying the above elements and a countershaft $c^3$ provided with gears $c^4$ and $c^5$. The sliding gear $c^2$ may be moved into engagement with gear $c^5$, thus causing the drive to be through the countershaft $c^3$. When the clutch face of the sliding gear $c^2$ engages the clutch face $c$ the drive is directly from shaft $b'$ to shaft $c'$. Reverse countershaft $c^6$ carries sliding gears $c^7$ and $c^8$, the former engaging gear $c^2$ and the latter $c^5$ to reverse the rotation of shaft $b'$.

Figure 1:
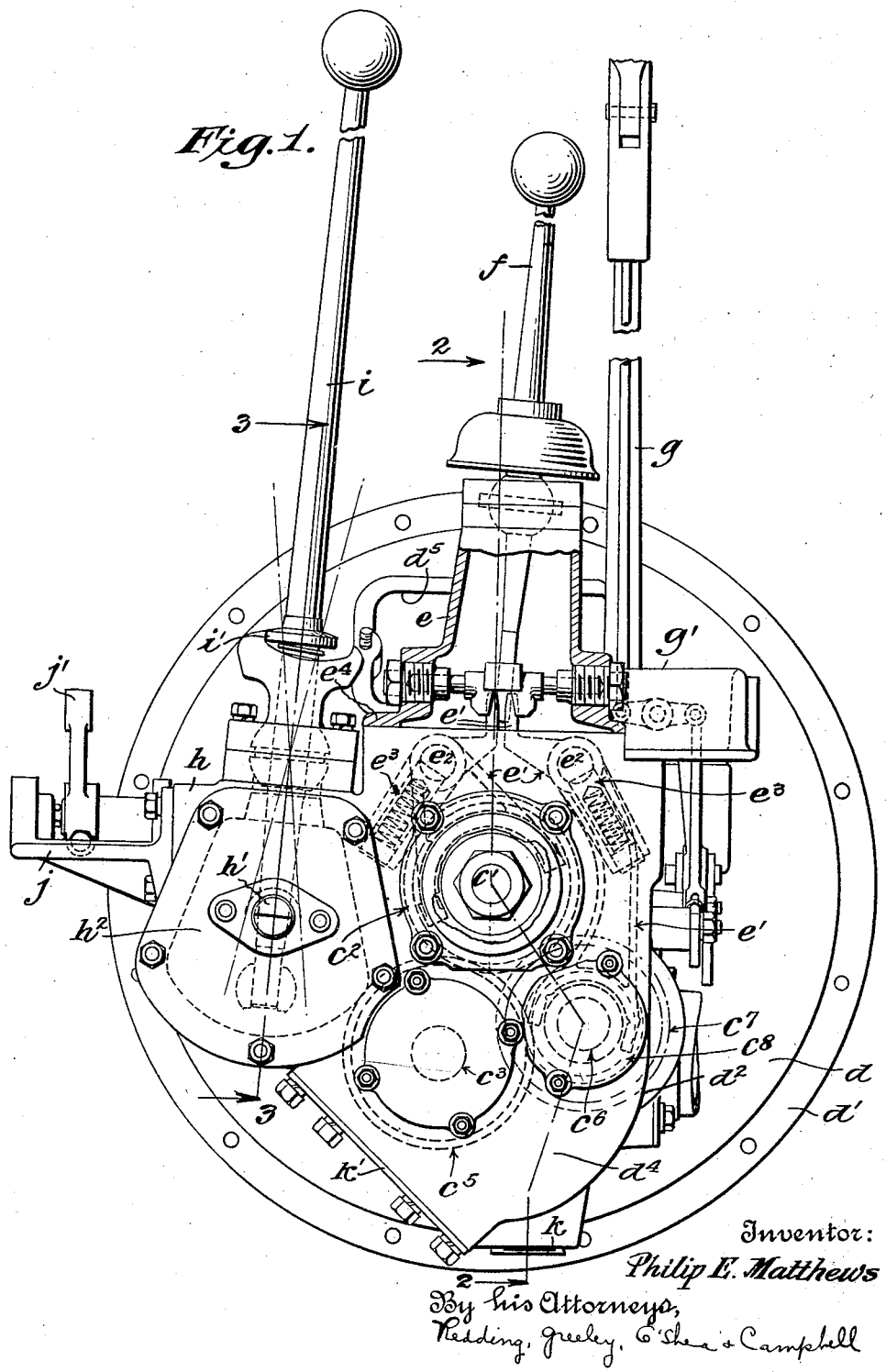
Figure 1 is an end elevation of a clutch bell housing constructed in accordance with the present invention.
Figure 2:
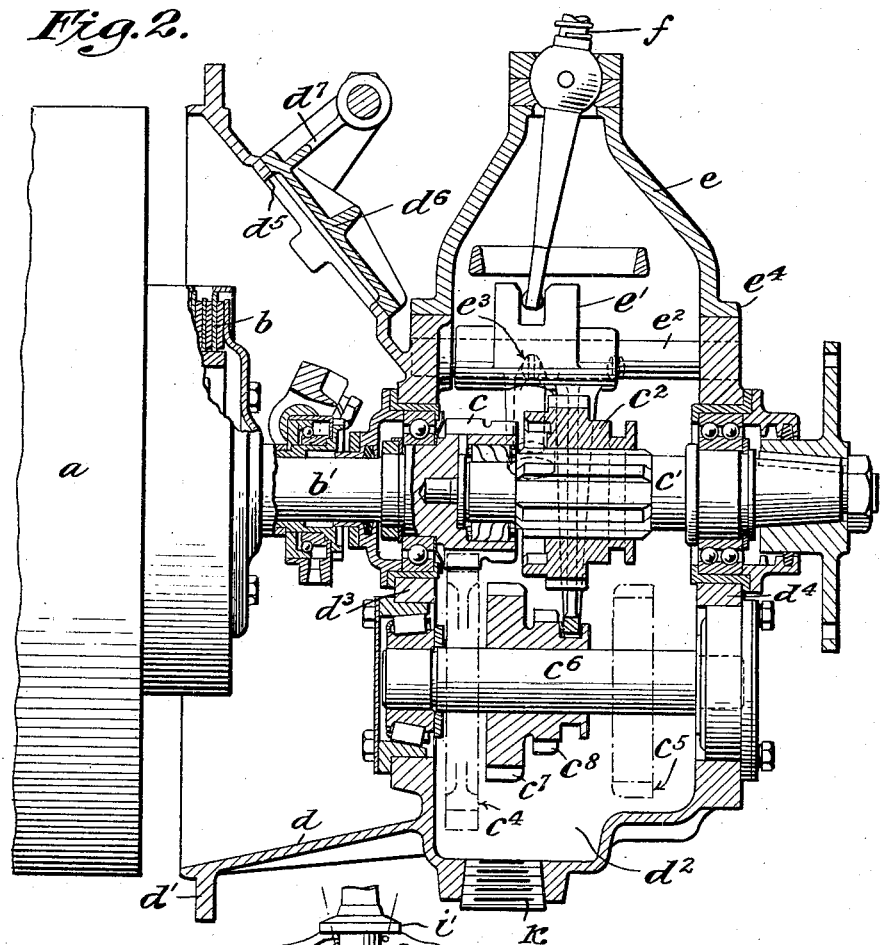
Figure 2 is a view in section taken on line 2—2 of Figure 1, and looking in the direction of the arrows.

The clutch bell housing $d$ is formed with the usual flange $d'$ for mounting it upon the engine and the housing is formed with a compartment $d^2$ for housing the secondary transmission described above. Partitions $d^3$ and $d^4$ prevent lubricant from the secondary transmission escaping into the clutch housing and the bearings in these partitions are effectively sealed as clearly shown in Figure 2. The upper side of the housing $d^2$ is provided with a closure $e$ which supports the secondary gear shifting lever $f$. This lever is mounted pivotally in the closure $e$ and moves slides $e'$ upon the notched shafts $e^2$. Spring pressed pawls $e^3$ cause the slides $e'$ to be held in either position representing the conditions of driving when the power is transmitted from shaft $b'$ to shaft $c'$ and when transmitted through the countershaft $c^3$. The closure $e$ is provided with a flange $e^4$ which is bolted to the upper portions of the partitions $d^3$ and $d^4$ as clearly shown in Figure 1.

The emergency brake lever is indicated at $g$ and mounted in extension $g'$ of the closure $e$. The closure, in this manner, includes as a unit the emergency brake lever as well as the secondary gear shifting lever.

Figure 3:
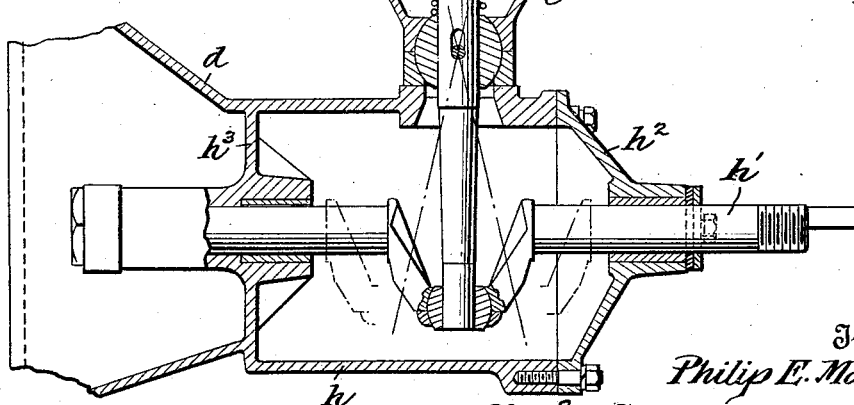
Figure 3 is a view in section taken on line 3—3 of Figure 2, and looking in the direction of the arrows.

Formed on the housing $d^2$ is an extension $h$ which consists of a hollow casing carrying slide shaft $h'$ for selecting and shifting the gears of the primary transmission. This casing is provided with an end closure $h^2$ which serves as a bearing for the slide shaft, the shaft being mounted at its other extremity in partition $h^3$ of the casing $h$. Pivoted in the upper wall of the casing $h$, is the primary gear shifting lever $i$ having guide flanges $i'$ carried upon the upper portion of the casing $h$. From Figure 3, it will be readily seen that the lever $i$ imparts both a rocking and sliding movement of the shaft $h'$.

A bracket $j$ is secured to the side of the casing $h$ and serves to mount the clutch lever $j'$. The usual plug $k$ is provided for draining the secondary transmission housing and closure as well as a closure plate $k'$ for such housing.

The clutch bell housing is provided with an opening $d^5$ for which closure $d^6$ is provided. This closure carries a bracket $d^7$ for mounting suitable control shafts for the vehicle.

From the above description, it will be seen that the clutch bell housing $d$ carries as a unit therewith, a secondary transmission including a reversing mechanism, the shifting lever for the primary transmission, the emergency brake lever, and the clutch lever $j'$. These elements may be assembled upon the casting forming the bell housing and the entire mounted in a single operation. The number of parts necessary for mounting these various elements has been greatly reduced and the ease of manufacture and assembling increased. Although various changes in design and arrangement of parts may be made, the invention is not to be limited, save as defined in the appended claim.

I claim as my invention:

A unitary clutch and transmission housing comprising a clutch bell housing, a compartment carried by the bell housing and adapted to receive a transmission, a second compartment carried by the first compartment adapted to receive a controlling means for the transmission, and a third compartment carried by the first compartment and adapted to receive a control for an additional transmission.

This specification signed this 13th day of June, A. D. 1928.

PHILIP E. MATTHEWS.